(12) United States Patent
Yli-Koski et al.

(10) Patent No.: US 9,677,687 B2
(45) Date of Patent: Jun. 13, 2017

(54) DEVICE FOR REDUCING FLOW NOISE AND VALVE

(75) Inventors: Esko Yli-Koski, Kerava (FI); Tomi Westen, Vantaa (FI)

(73) Assignee: METSO AUTOMATION INC., Vantaa (FI)

( * ) Notice: Subject to any disclaimer, the term of this patent is extended or adjusted under 35 U.S.C. 154(b) by 0 days.

(21) Appl. No.: 14/009,447

(22) PCT Filed: Apr. 3, 2012

(86) PCT No.: PCT/FI2012/050337
§ 371 (c)(1),
(2), (4) Date: Oct. 2, 2013

(87) PCT Pub. No.: WO2012/136890
PCT Pub. Date: Oct. 11, 2012

(65) Prior Publication Data
US 2014/0021383 A1 Jan. 23, 2014

(30) Foreign Application Priority Data
Apr. 4, 2011 (FI) .......... 20115318

(51) Int. Cl.
*F16K 47/02* (2006.01)
*F16L 55/04* (2006.01)
(Continued)

(52) U.S. Cl.
CPC .......... *F16K 47/02* (2013.01); *F16K 47/04* (2013.01); *F16K 47/045* (2013.01); *F16K 47/08* (2013.01);
(Continued)

(58) Field of Classification Search
CPC .......... F16K 47/02; F16K 47/04; F16K 47/08; F16L 55/027; Y10T 137/86718;
(Continued)

(56) References Cited

U.S. PATENT DOCUMENTS 3,514,074 A * 5/1970 Self .............................. 251/127
3,545,492 A * 12/1970 Scheid, Jr. .................... 138/42
(Continued)

FOREIGN PATENT DOCUMENTS

DE 511 490 10/1930
DE 25 00723 A1 7/1975
(Continued)

OTHER PUBLICATIONS

Mar. 8, 2012 Search Report issued in Finnish Patent Application No. 20115318 (with translation).
(Continued)

*Primary Examiner* — Michael R Reid
*Assistant Examiner* — Christopher Ballman
(74) *Attorney, Agent, or Firm* — Oliff PLC (57) ABSTRACT

Disclosed is a device for reducing flow noise. In order to achieve a low flow noise, the device includes inlet apertures for receiving a fluid flow, chambers into which one or more inlet apertures open up, a cross-sectional area of a single chamber being larger than a combined flow cross-sectional area of the inlet apertures opening up thereto, and chamber-specific outlet apertures for forwarding the fluid flow from the chamber, a flow cross-sectional area of each outlet aperture being smaller than the cross-sectional area of the chamber, and the combined flow cross-sectional area of all outlet apertures of the single chamber being larger than the combined flow cross-sectional area of the inlet apertures opening up into said chamber.

16 Claims, 5 Drawing Sheets

(51) Int. Cl.
*F16K 47/04* (2006.01)
*F16L 55/027* (2006.01)
*F16L 55/033* (2006.01)
*F16K 47/08* (2006.01)

(52) U.S. Cl.
CPC ... *F16L 55/02718* (2013.01); *F16L 55/02781* (2013.01); *F16L 55/033* (2013.01); *F16L 55/04* (2013.01); *Y10T 137/86718* (2015.04); *Y10T 137/86743* (2015.04); *Y10T 137/86751* (2015.04); *Y10T 137/86863* (2015.04)

(58) Field of Classification Search
CPC ..... Y10T 137/86743; Y10T 137/86751; Y10T 137/86863
USPC ............ 137/625.28, 625.31, 625.32, 625.46; 251/127
See application file for complete search history.

(56) References Cited

U.S. PATENT DOCUMENTS

| | | | | |
|---|---|---|---|---|
| 3,880,191 A | * | 4/1975 | Baumann | 137/625.32 |
| 4,108,210 A | * | 8/1978 | Luthe et al. | 138/42 |
| 4,271,866 A | * | 6/1981 | Bey | 137/625.3 |
| 4,397,331 A | | 8/1983 | Medlar | |
| RE32,197 E | * | 7/1986 | Self | 251/127 |
| 4,921,014 A | * | 5/1990 | Tartaglia | F16K 47/08 137/494 |
| 5,020,571 A | * | 6/1991 | Tartaglia | F16K 47/08 137/625.3 |
| 5,503,184 A | * | 4/1996 | Reinartz et al. | 137/625.3 |
| 5,772,178 A | * | 6/1998 | Bey | 251/127 |
| 5,971,604 A | * | 10/1999 | Linga et al. | 366/340 |
| 5,988,586 A | * | 11/1999 | Boger | 251/127 |
| 6,394,134 B1 | * | 5/2002 | Kwon | F16K 47/08 137/625.3 |
| 2004/0055816 A1 | | 3/2004 | Gallagher et al. | |
| 2010/0258193 A1 | * | 10/2010 | Christenson et al. | 137/1 |

FOREIGN PATENT DOCUMENTS

| | | |
|---|---|---|
| DE | 26 54 769 A1 | 6/1978 |
| EP | 0 487 163 A1 | 5/1992 |
| FR | 2 257 830 | 1/1975 |

OTHER PUBLICATIONS

Jul. 9, 2013 International Preliminary Report on Patentability issued in International Patent Application No. PCT/FI2012/050337.

Jul. 13, 2012 Search Report issued in International Patent Application No. PCT/FI2012/050337.

* cited by examiner

DEVICE FOR REDUCING FLOW NOISE AND VALVE

FIELD OF THE INVENTION

This invention relates to reducing flow noise and to a valve, and particularly to a device enabling pipeline flow control to be implemented in a noise reducing manner.

DESCRIPTION OF PRIOR ART

In connection with flow control, it is important to manage noise such that it is not harmful to the environment or those working in the vicinity. It is not in all situations purposeful to increase the wall thicknesses of pipelines and the devices included therein e.g. by noise reducing materials. Therefore, it is also necessary to influence the flow itself in a manner in which the noise caused by the flow may be reduced.

A noise level produced by a free jet increases strongly as flow velocity increases. In connection with a control valve in a pipeline flow, a situation similar to that of a free jet occurs at the last choke point leading to the pipeline, in which case the flow velocity therein is significant in the generation of noise. A low flow velocity may only be achieved with a sufficiently large flow cross-sectional area of the choke point.

The frequency of free jet noise is the higher the smaller the diameter of the jet. The higher the frequency, the more efficiently the wall of a pipe dampens the noise emitted from inside the pipe.

Situations exist in flow control wherein a pressure difference over the control valve is great. For instance the volume of gases is reduced by increasing pressure in transfer and storage of the gases. From this high pressure the gas is led in a controlled manner to a lower, actual operating pressure. In a choke member of the control valve, the flow velocity of gases at a great pressure difference increases up to a supersonic velocity.

SUMMARY OF THE INVENTION

An object of this invention is to solve the above-described problem and provide a solution which enables flow noise to be reduced efficiently in flow control. This object is achieved by a device as claimed in independent claim 1, and a valve as claimed in independent claim 13.

In order to reduce flow noise, a device is utilized wherein a fluid flow is led to a chamber via an inlet aperture or inlet apertures, the chamber having a larger cross-sectional area than that of the inlet apertures of said chamber in total, and the flow is forwarded from the chamber via a plurality of small outlet apertures, each outlet aperture having a smaller flow cross-sectional area than that of the chamber and a larger combined cross-sectional area than that of the inlet apertures of said chamber in total. This enables the chamber to be used for achieving a controlled change in the flow and the flow to be divided into smaller portions in an as efficient and noise-reducing manner as possible. The device may be utilized alone in a pipeline, or it may be integrated in a valve.

Preferred embodiments of the device and valve according to the invention are disclosed in the attached dependent claims.

BRIEF DESCRIPTION OF THE FIGURES

In the following, the invention will be described in greater detail by way of example and with reference to the accompanying figures, in which.

2

DESCRIPTION OF AT LEAST ONE EMBODIMENT

Figure 1:
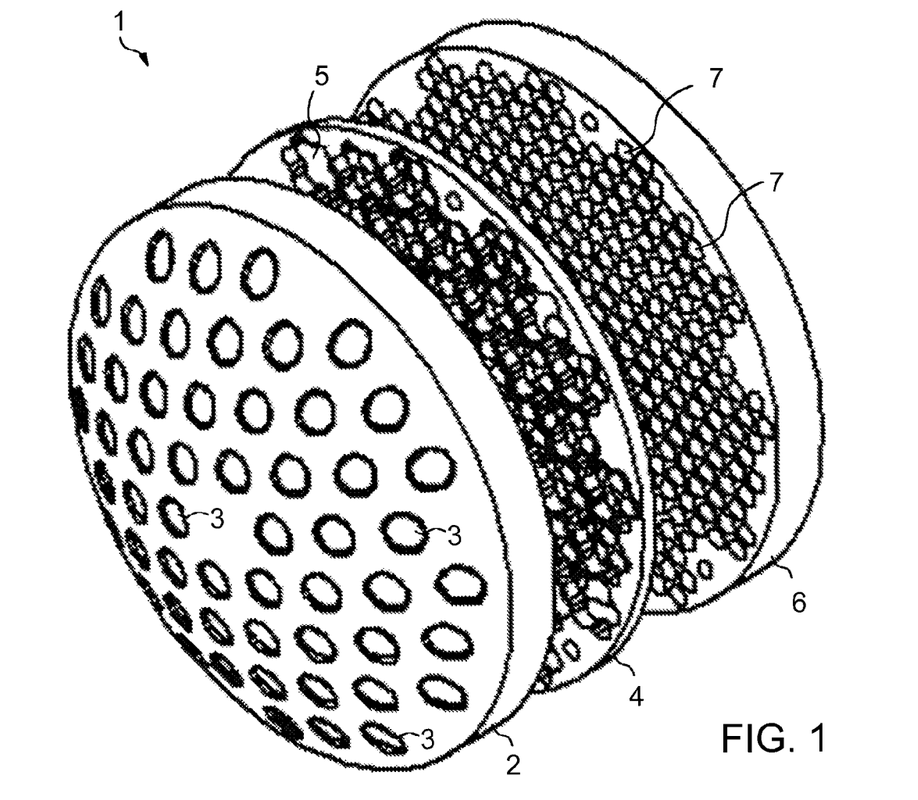
FIGS. 1 to 3 illustrate a first embodiment of a device.
Figure 2:
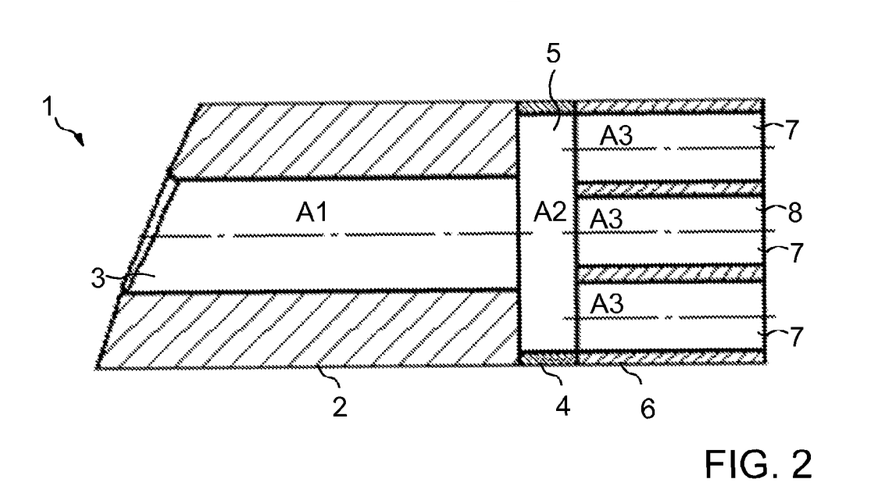
Figures 3, 4, 5:
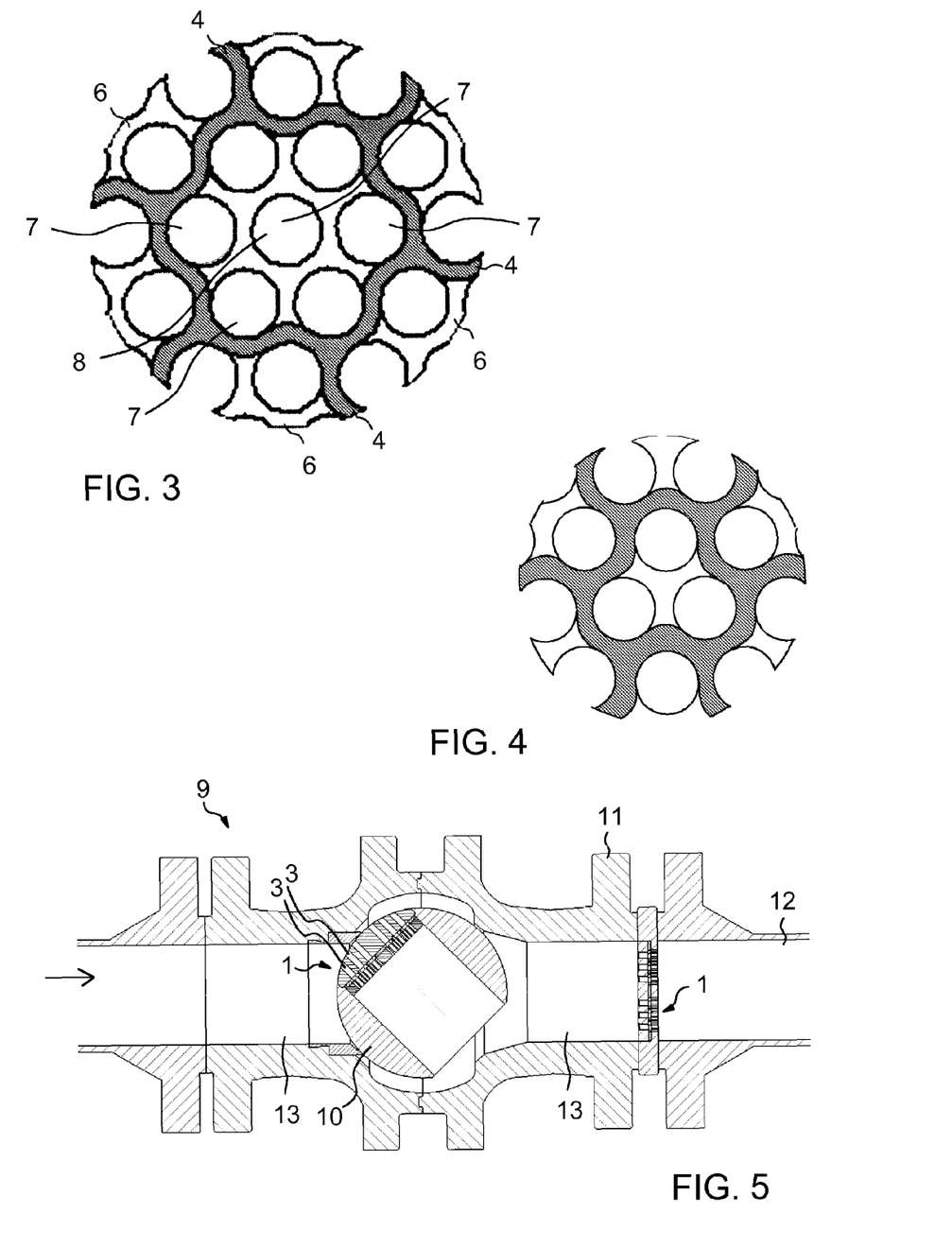
FIG. 4 illustrates an alternative chamber design.
FIG. 5 illustrates the device arranged in a valve.

FIGS. 1 to 3 illustrate a first embodiment of a device. FIG. 1 is an exploded view of the device 1, FIG. 2 is a partial section of the device 1 of the figure, and FIG. 3 shows the design of the transverse flow area of chambers.

In the following, it is by way of example assumed that the device is implemented by means of three parts (e.g. three plates) to be placed against one another, as shown by way of example in the figures. However, it is to be noted that this is not necessary in all embodiments since the necessary apertures and chambers may also be implemented in other ways, e.g. by machining both inlet and outlet apertures as well as chambers in some of the shown parts.

In the exemplary case of FIG. 1, a part 2 situated on the left has an inlet surface which is provided with a plurality of inlet apertures 3 for receiving a fluid flow. A middle part 4 is provided with chambers 5, in which case the inlet apertures 3 are chamber-specific, i.e. each inlet aperture opens up into one chamber only, enabling fluid from a single inlet aperture to flow into one chamber only. One inlet aperture (the exemplary case shown in the figure) or more inlet apertures 3 may open up into a single chamber 5. A part 6 situated on the right, in turn, is provided with a plurality of outlet apertures 7 for each chamber. The inlet and outlet apertures may be circularly round. This, however, is not necessary but, owing to the manner of manufacture, it is also feasible that the apertures have another shape.

The device of FIG. 1 is thus provided with a plurality of parallel chambers 5 into which a fluid flow arriving at the device 1 is divided via the inlet apertures 3 in the inlet surface. After the device 1, the plurality of smaller fluid flows exiting the parallel chambers via the outlet apertures 7 may again unite into a uniform flow e.g. in a pipeline or a valve in which the device may be arranged.

FIG. 2 shows a single chamber 5 as well as an inlet aperture 3 and outlet apertures 7 of said chamber. The cross-sectional area A2 of the chamber 5 is larger than the flow cross-sectional area A1 of the inlet aperture 3, and each outlet aperture 7 has a smaller flow cross-sectional area A3 than the chamber, but the combined flow cross-sectional area of the outlet apertures 7 is larger than the flow cross-sectional area of the inlet aperture A1. If the cross-sectional area of the chamber is not the same over the entire length of the chamber but the chamber is conical, for instance, the largest cross-sectional area of the chamber is larger than the flow cross-sectional area of the inlet aperture, and each outlet aperture has a smaller flow cross-sectional area than the largest cross-sectional area of the chamber.

If more than one inlet aperture opens up into a single chamber, the combined flow cross-sectional area of the outlet apertures of said chamber is larger than the combined flow cross-sectional area of the inlet apertures opening up into said chamber. Such an expanding flow cross-sectional area is necessary for restricting the flow velocity when the volume of a fluid, such as gas, expands as pressure decreases.

When a flowing fluid, such as gas, is led at a great pressure difference into a chamber 4 having a limited depth via the inlet aperture 3 or inlet apertures, and shocks of a supersonic jet are then formed in the chamber 4, said shocks are not allowed to continue freely, which, in connection with vibration, would cause noise. Instead, the shocks are confined to the chamber 5 wherein they are controllable, by attaching them to surfaces, whereby the noise ordinarily caused by free shocks can be minimized efficiently. The shocks lower the pressure level efficiently, and the formation thereof is not prevented. Only their vibration, which is a considerable noise source, is prevented by attaching them to the confined surfaces of the chamber. The fluid that has thus been received in the chamber is allowed to become discharged as smaller flows via the outlet apertures 7. In this context, supersonic refers to a fluid flow, e.g. a gas flow, whose flow velocity is higher than the speed of sound in said fluid.

FIG. 3 shows a part of the device from a direction of the fluid flow, with the left part 2 of FIG. 1 removed. In practice, then, in FIG. 3 the middle part 4 is situated on top (closest to the viewer) while the right part 6 of FIG. 1 is situated at the bottom. In FIG. 3, the surface of the part 4 is darker so as to make it more distinguishable from the surface of the lighter part 6.

It can be seen in FIG. 3 that the outlet apertures 7 are distributed as efficiently as possible over the part 6 with the purpose of producing a total flow surface area which is as large as possible. In this example, the shape of the chambers 5 provided in the part 4 is not round but the chambers are shaped to follow the edges of the outlet apertures 7 such that the outlet apertures 7 are chamber-specific, i.e. fluid flows into one outlet aperture 7 from only one chamber 5. The end result in this example is a chamber 5 which opens up via seven outlet apertures 7.

It can be seen in FIGS. 2 and 3 that from among the outlet apertures 7, a middle outlet aperture 8 is arranged substantially coaxially with the inlet aperture 3, i.e. at least partly in the same line with the inlet aperture 3 of the chamber 5. Thus, at least a portion of the flow received in the chamber 5 from the inlet aperture 3 is allowed to advance linearly so as to exit via the middle outlet aperture 8. The velocity of the flow exiting via the middle outlet aperture 8 is thus higher than the velocity of the flow discharging via the apertures surrounding it. Thus, the higher noise possibly caused by the high-velocity flow is surrounded by slower and less noisy flows, whereby the higher noise becomes dampened by the slower flows, without being allowed to advance directly to the environment.

Not all outlet apertures have to be the same size. A feasible alternative is that the middle outlet aperture 8 is slightly larger than the outlet apertures 7 surrounding it.

FIG. 4 illustrates an alternative chamber design. In FIG. 4, a single chamber opens up into three outlet apertures. Such a design also provides a solution wherein in the last part 6 in the flow direction, the outlet apertures 7 may be arranged as densely as possible, their combined surface area thus being as large as possible.

Figure 9:
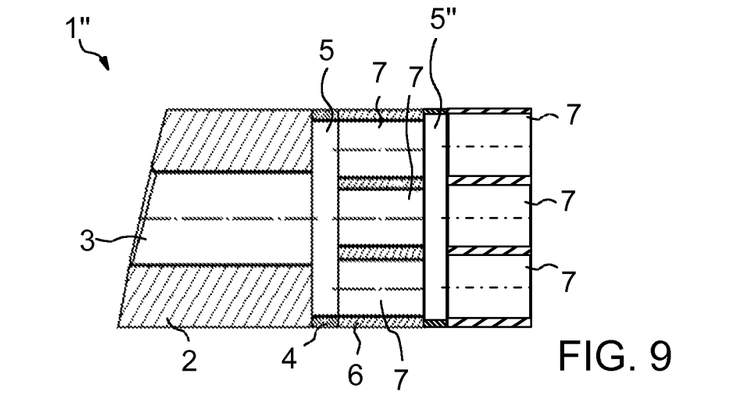
FIG. 9 illustrates a third embodiment of the device.

FIG. 5 illustrates the device 1 of FIG. 1, arranged in a valve 9. The valve shown by way of example in FIG. 9 is a control valve. In FIG. 5, the device 1 is by way of example arranged even in two different places in the valve 9, i.e. in its closure member 10 and, additionally, in the flow channel in the flow direction after the valve 9, in practice after a flange 11 by which the valve 9 is connected to a pipeline 12.

In practice, the device of FIG. 1 may thus be utilized such that a plurality of devices 1 is arranged successively in the flow direction. Alternatively, it is feasible that a single device 1 will suffice, in which case it may be arranged in either one of the places shown in FIG. 5.

In FIG. 5, the device arranged in the closure member 10 moves along with the closure member 10 from a position closing a flow channel 13 of the valve to a position wherein a flow via the valve becomes possible via the device 1. In the example of FIG. 5, the valve 9 is a ball valve whose closure member 10 is movable expressly by rotating, by means of a shaft (not shown in the figure) protruding from the closure member, for instance. In the situation of FIG. 5, the closure member 9 is situated approximately in a middle position between the extremes of the path thereof, where the flow channel 13 is partly open. The fluid flow is thus allowed to advance via some apertures 3, 7 and chambers 5 of the device 1 to the pipeline 12. Since the chambers 5 have no inlet apertures 3 or outlet apertures 7 in common, a flow is possible only via chambers whose inlet apertures in FIG. 5 have been subjected to a flow coming from the left in FIG. 5.

The device shown in connection with the flange 11 may be situated expressly after the valve 9, as shown, attached to the flow channel 13 or, alternatively, in the pipeline 12 farther away from the valve 9.

In FIG. 1, the inlet surface of the device 1, i.e. the surface provided with the inlet apertures 3, is shown to be convex. As distinct from this, said surface may be concave, particularly if the device is arranged in the flow channel 13 after the closure member of the valve. Such a concave inlet surface may match the shape of the spherical surface of the closure member and thus be situated in the immediate vicinity of the spherical surface. In such a case, in a partially open position of the closure member, only some of the flow channels formed by the inlet apertures 3, chambers 5 and outlet apertures 7 are subjected to flow.

As distinct from FIG. 5, it is also feasible that the flow channel 13 is before the closure member 10 provided with the device 1. In such a case, the device may have a concave outlet surface, i.e. the surface into which the outlet apertures 7 open up is concave. The device 1 may thus be situated in the flow direction immediately before the closure member 10 having a spherical surface.

Figure 6:
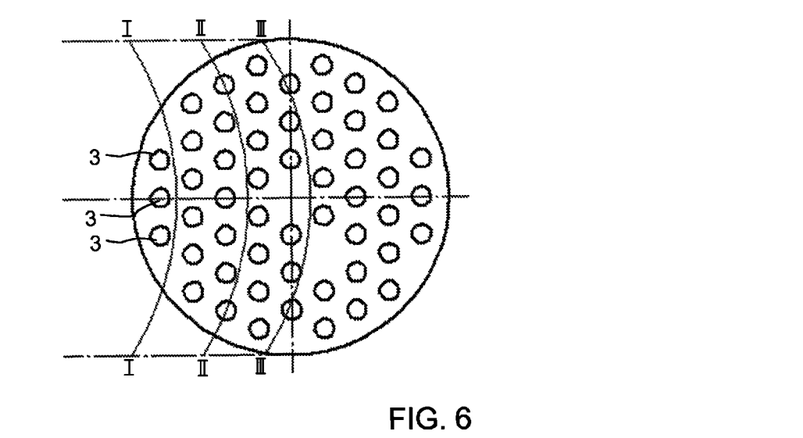
FIG. 6 illustrates increasing a flow cross-sectional area as far as the valve of FIG. 5 is concerned.

FIG. 6 illustrates increasing a flow cross-sectional area as far as the valve 9 of FIG. 5 is concerned. FIG. 6 shows how large a portion of the inlet apertures 3 of the device 1 arranged in the closure member 10 at different rotating angles of the closure member 9 is subjected to the flow coming from the left in FIG. 5.

It can be seen in FIG. 6 that after rotating phase I only three inlet apertures 3 are subjected to flow. When the closure member is further rotated from this position, more inlet apertures 3 are subjected to flow after rotating phase II, and the number of inlet apertures subjected to flow further increases after rotating phase III. This corresponds to a situation wherein the closure member has been rotated to the position shown in FIG. 5. When the closure member is still further rotated, it will eventually settle in a position wherein the closure member has been rotated such that the entire front surface of the device 1 therein visible in FIG. 6 has been rotated towards the flow.

It is feasible that the flow cross-sectional area of inlet apertures 3 (as well as chambers and outlet apertures continuing therefrom) subjected to flow after rotating phase I is smaller than the flow cross-sectional area of inlet apertures 3 (as well as chambers and outlet apertures continuing therefrom) being subjected after subsequent rotating phases, e.g. rotating phase III.

Figure 7:
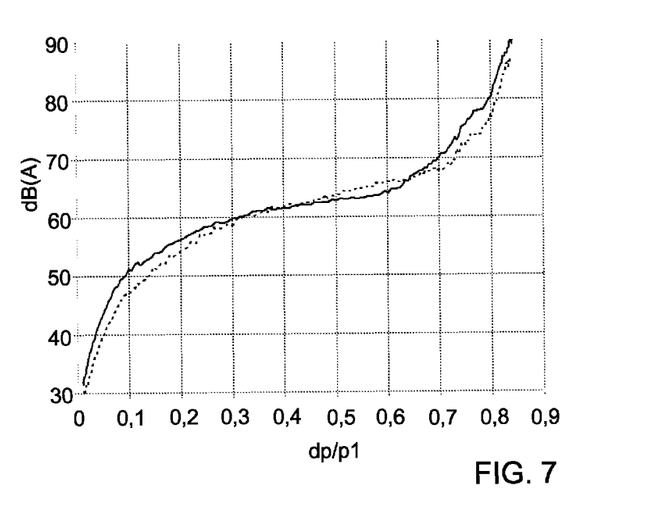
FIG. 7 illustrates efficiency of dampening flow noise.

FIG. 7 illustrates the efficiency of dampening flow noise by the device shown in FIGS. 1 to 3 when such a device is arranged in a pipe as shown in FIG. 5.

In FIG. 7, the vertical axis shows noise dB(A) while the horizontal axis shows a pressure difference ratio dp/p1 for a device wherein the diameter of a flow channel 13 is 100 mm (DN 100) when the device 1 is provided with 54 inlet apertures 3 whose diameter is 6 mm, 54 chambers whose depth is 3 mm, the chambers opening up into outlet apertures 7 whose diameter is 3.7 mm. The curve drawn in broken line in FIG. 7 relates to a situation wherein each chamber is provided with seven outlet apertures, one of which is situated in the middle substantially coaxially with an inlet aperture, i.e. at least partly in the same line with the inlet aperture, and the rest around it, as shown in FIGS. 2 and 3. The curve drawn in uniform line, in turn, relates to a situation wherein no middle aperture exists, the number of outlet apertures thus being six.

Figure 8:
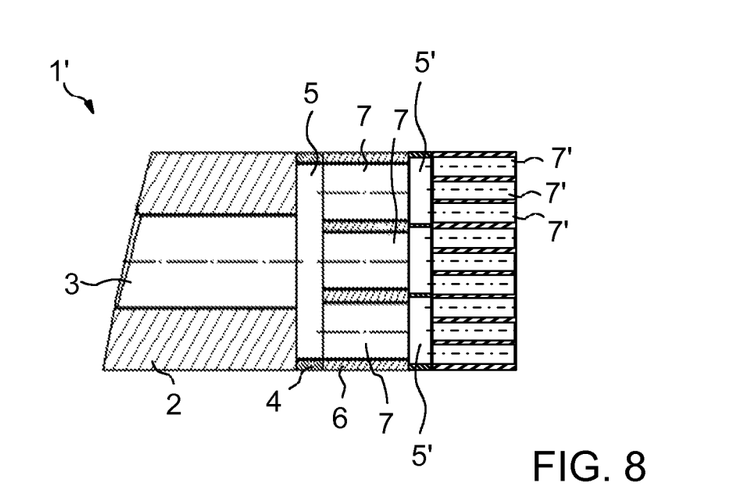
FIG. 8 illustrates a second embodiment of the device.

FIG. 8 illustrates a second embodiment of the device. The embodiment of FIG. 8 largely corresponds to the embodiment of FIG. 1, wherefore the embodiment of FIG. 8 will be explained in the following primarily by disclosing differences from the embodiment of FIG. 1.

The left half (the inlet aperture 3, the chamber 5 and the outlet apertures 7) of the device 1' of FIG. 8 matches completely the device 1 shown in FIG. 1. In this embodiment, however, more than one corresponding device is arranged successively. Thus, the outlet apertures 7 simultaneously form inlet apertures for a second chamber 5' such that each outlet aperture 7 leads to a second individual chamber 5' of its own. As distinct from FIG. 8, it is also feasible that more than one outlet aperture 7 leads to each of the second chambers 5'. Each of the second chambers 5', in turn, is provided with individual outlet apertures 7' of its own, wherefrom the flow is allowed to advance from said second chamber 5'. The cross-sectional area of each of the second chambers 5' is larger than the flow cross-sectional area of the outlet aperture 7 or outlet apertures feeding fluid thereto, and the combined flow cross-sectional area of outlet apertures 7' further leading from the second chamber 5' is larger than the flow cross-sectional area of the outlet aperture 7 or outlet apertures feeding fluid to said second chamber.

FIG. 9 illustrates a third embodiment of the device. The embodiment of FIG. 9 largely corresponds to the embodiment of FIG. 1, wherefore in the following the embodiment of FIG. 9 will be explained primarily by disclosing differences from the embodiment of FIG. 1.

The left half (the inlet aperture 3, the chamber 5 and the outlet apertures 7) of the device 1" of FIG. 9 matches completely the device 1 shown in FIG. 1. However, in this embodiment, the outlet apertures 7 simultaneously form inlet apertures for a second chamber 5". Only one single second chamber 5" is in use which receives the flow from all outlet apertures 7 of the chamber 5. From the second chamber 5" the flow is allowed to advance via a plurality of outlet apertures 7.

Figure 10:
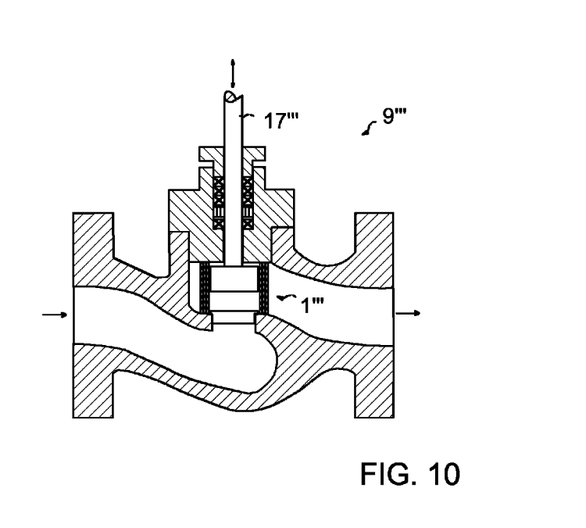
FIGS. 10 to 11 illustrate a fourth embodiment of the device.
Figure 11:
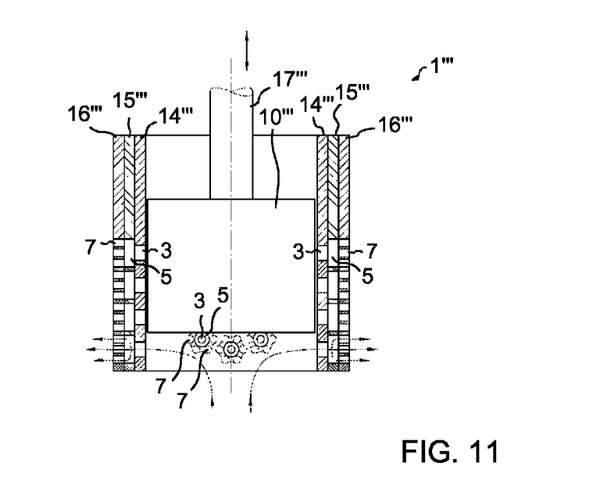

FIGS. 10 and 11 illustrate a fourth embodiment of the device 1'''. The embodiment of FIGS. 10 and 11 relates to the use of the device 1''' in a linear valve, FIG. 11 showing a cross-section of the device 1''' and FIG. 10 illustrating installation of the device in a linear valve 9'.

In the embodiment of FIGS. 10 and 11, the device 1''' may be implemented e.g. by three cylinders 14''', 15''' and 16''' arranged within one another. In the example of the figures, the innermost cylinder 14''' is provided with inlet apertures 3, the middle cylinder 15''' is provided with chambers 5, and the outermost cylinder 16''' is provided with outlet apertures 7. The inlet apertures, chambers and outlet apertures are arranged and dimensioned as disclosed in connection with the previous embodiments.

Instead of cylinders, in place of one or more cylinders it is possible to use e.g. rings to be stacked on top of one another such that the rings are at appropriate points provided with necessary grooves and/or holes in order to enable inlet apertures, chambers and/or outlet apertures to be formed therebetween.

The closure member 10''' of the linear valve 9''', which in the figures is by way of example shown as a cylindrical piston, moves in the figures along with an axle 17''' vertically between a position closing the flow channel of the valve and a position completely opening the flow channel of the valve.

It is to be understood that the above description and the related figures are only intended to illustrate the present invention. It will be apparent to a person skilled in the art that the invention may be varied and modified also in other ways without departing from the scope of the invention.

The invention claimed is:

1. A device for reducing flow noise, the device comprising:
  an inlet surface provided with a plurality of inlet apertures for receiving a fluid flow;
  an outlet surface provided with a plurality of outlet apertures for forwarding the fluid from the device; and
  a plurality of chambers into which the plurality of inlet apertures of the inlet surface open up, at least one of the plurality of chambers is separated from adjacent chambers surrounding the at least one of the plurality of chambers by intermediate walls providing confining surfaces for the chambers, the inlet apertures being chamber-specific such that each single inlet aperture of the plurality of inlet apertures opens up into one chamber only and one or more inlet apertures of the plurality of inlet apertures open up into a single chamber, and a cross-sectional area of each chamber of the plurality of chambers being larger than a combined flow cross-sectional area of the one or more inlet apertures opening up thereto,
  wherein the plurality of outlet apertures are chamber-specific and are arranged in the outlet surface for forwarding the fluid flow from the plurality of chambers, a flow cross-sectional area of each outlet aperture being smaller than the cross-sectional area of a single chamber of the plurality of chambers, and a combined flow cross-sectional area of all outlet apertures of the single chamber in the outlet surface being larger than the combined flow cross-sectional area of the one or more inlet apertures in the inlet surface opening up into the chamber,
  the at least one of the plurality of chambers has only three, only six, or only seven outlet apertures, and
  the at least one of the plurality of chambers is shaped to have confining surfaces provided by the intermediate walls of the chambers which surround the chamber-specific outlet apertures of the at least one of the plurality of chambers by following the shape of the edges of the only three, only six, or only seven outlet apertures.

2. A device as claimed in claim 1, wherein the device comprises a first part wherein the inlet apertures are formed, a second part which is arranged against the first part and wherein the chambers are formed, and a third part which is arranged against the second part and wherein the outlet apertures are formed.

3. A device as claimed in claim 1, wherein the outlet apertures of at least one of the plurality of chambers are arranged such that one outlet aperture is at least partly in the same line with the inlet aperture of the chamber, whereby at least a portion of the fluid flow to be received from the inlet aperture may advance directly via the one outlet aperture while the rest of the outlet apertures of the chamber are arranged to surround the one outlet aperture.

4. A device as claimed in claim 1, wherein the device comprises second chambers into which one or more outlet apertures open up, and from each of the second chambers a plurality of outlet apertures opens up in order to forward the fluid flow.

5. A device as claimed in claim 1, wherein all chamber-specific outlet apertures of the single chamber open up into a same second chamber, the second chamber being provided with chamber-specific outlet apertures in order to forward the fluid flow.

6. A device as claimed in claim 1, wherein the device is in a closure member of a valve, the closure member being movable from a position closing a flow channel of the valve to a position wherein a flow in the flow channel of the valve becomes possible via the device.

7. A device as claimed in claim 6, wherein the valve is a rotary valve whose closure member is movable by rotating.

8. A device as claimed in claim 1, wherein the device is arranged in a linear valve.

9. A device as claimed in claim 8, wherein the device is made into a cylinder which is formed by one or more parts and which surrounds a closure member of a linear valve.

10. A device as claimed in claim 1, wherein the device is arranged in a flow channel after a valve in the direction of the fluid flow.

11. A device as claimed in claim 10, wherein the valve comprises a closure member having a spherical surface, and that the device comprises a concave inlet surface situated in the immediate vicinity of the closure member.

12. A device as claimed in claim 1, wherein the device is arranged in a flow channel in the flow direction before a closure member of a valve, the closure member having a spherical surface, and that the device comprises a concave outlet surface situated in the immediate vicinity of the closure member.

13. A valve comprising:
a flow channel;
a closure member situated in the flow channel, the closure member being movable from a position closing the flow channel of the valve to a position wherein a flow through the flow channel of the valve becomes possible; and
a device in the flow channel for reducing flow noise, the device comprising:
an inlet surface provided with a plurality of inlet apertures for receiving a fluid flow;
an outlet surface provided with a plurality of outlet apertures for forwarding the fluid from the device; and
a plurality of chambers into which the plurality of inlet apertures of the inlet surface open up, at least one of the plurality of chambers is separated from adjacent chambers surrounding the at least one of the plurality of chambers by intermediate walls providing confining surfaces for the chambers, the inlet apertures being chamber-specific such that each single inlet aperture of the plurality of inlet apertures opens up into one chamber only and one or more inlet apertures of the plurality of inlet apertures open up into a single chamber, and a cross-sectional area of each chamber of the plurality of chambers being larger than a combined flow cross-sectional area of the one or more inlet apertures opening up thereto,
wherein the plurality of outlet apertures are chamber-specific and are arranged in the outlet surface for forwarding the fluid flow from the plurality of chambers, a flow cross-sectional area of each outlet aperture being smaller than the cross-sectional area of a single chamber of the plurality of chambers, and a combined flow cross-sectional area of all outlet apertures of the single chamber in the outlet surface being larger than the combined flow cross-sectional area of the one or more inlet apertures in the inlet surface opening up into the chamber,
the at least one of the plurality of chambers has only three, only six, or only seven outlet apertures, and
the at least one of the plurality of chambers is shaped to have confining surfaces provided by the intermediate walls of the chambers which surround the chamber-specific outlet apertures of the at least one of the plurality of chambers by following the shape of the edges of the only three, only six, or only seven outlet apertures.

14. A valve as claimed in claim 13, wherein the device is in the closure member of the valve.

15. A valve as claimed in claim 13, wherein the device is arranged in the flow channel in the flow direction before or after the closure member.

16. A device for reducing flow noise, the device comprising:
an inlet surface provided with a plurality of inlet apertures for receiving a fluid flow;
an outlet surface provided with a plurality of outlet apertures for forwarding the fluid from the device; and
a plurality of chambers into which the plurality of inlet apertures of the inlet surface open up, the inlet apertures being chamber-specific such that each single inlet aperture of the plurality of inlet apertures opens up into one chamber only and one or more inlet apertures of the plurality of inlet apertures open up into a single chamber, and a cross-section al area of each chamber of the plurality of chambers being larger than a combined flow cross-sectional area of the one or more inlet apertures opening up thereto;
wherein the plurality of outlet apertures are chamber-specific and are arranged in the outlet surface for forwarding the fluid flow from the plurality of chambers, a flow cross-sectional area of each outlet aperture being smaller than the cross-sectional area of a single chamber of the plurality of chambers, and a combined flow cross-sectional area of all outlet apertures of the single chamber in the outlet surface being larger than the combined flow cross-sectional area of the one or more inlet apertures in the inlet surface opening up into the chamber,
at least one of the plurality of chambers has only seven outlet apertures such that a middle aperture is arranged to allow a flow received in the chamber to advance linearly from one or more inlet apertures to exit via the middle outlet aperture while the other outlet apertures are arranged to surround the middle aperture, and the at least one of the plurality of chambers is shaped to follow the shape of the edges of the only seven outlet apertures.

\* \* \* \* \*